March 20, 1956 J. T. HOWES 2,739,020
BEARING AND LUBRICATING STRUCTURE
Filed June 25, 1953 2 Sheets-Sheet 1

INVENTOR.
JOHN T. HOWES
BY James and Franklin
ATTORNEY

March 20, 1956      J. T. HOWES      2,739,020
BEARING AND LUBRICATING STRUCTURE
Filed June 25, 1953      2 Sheets-Sheet 2
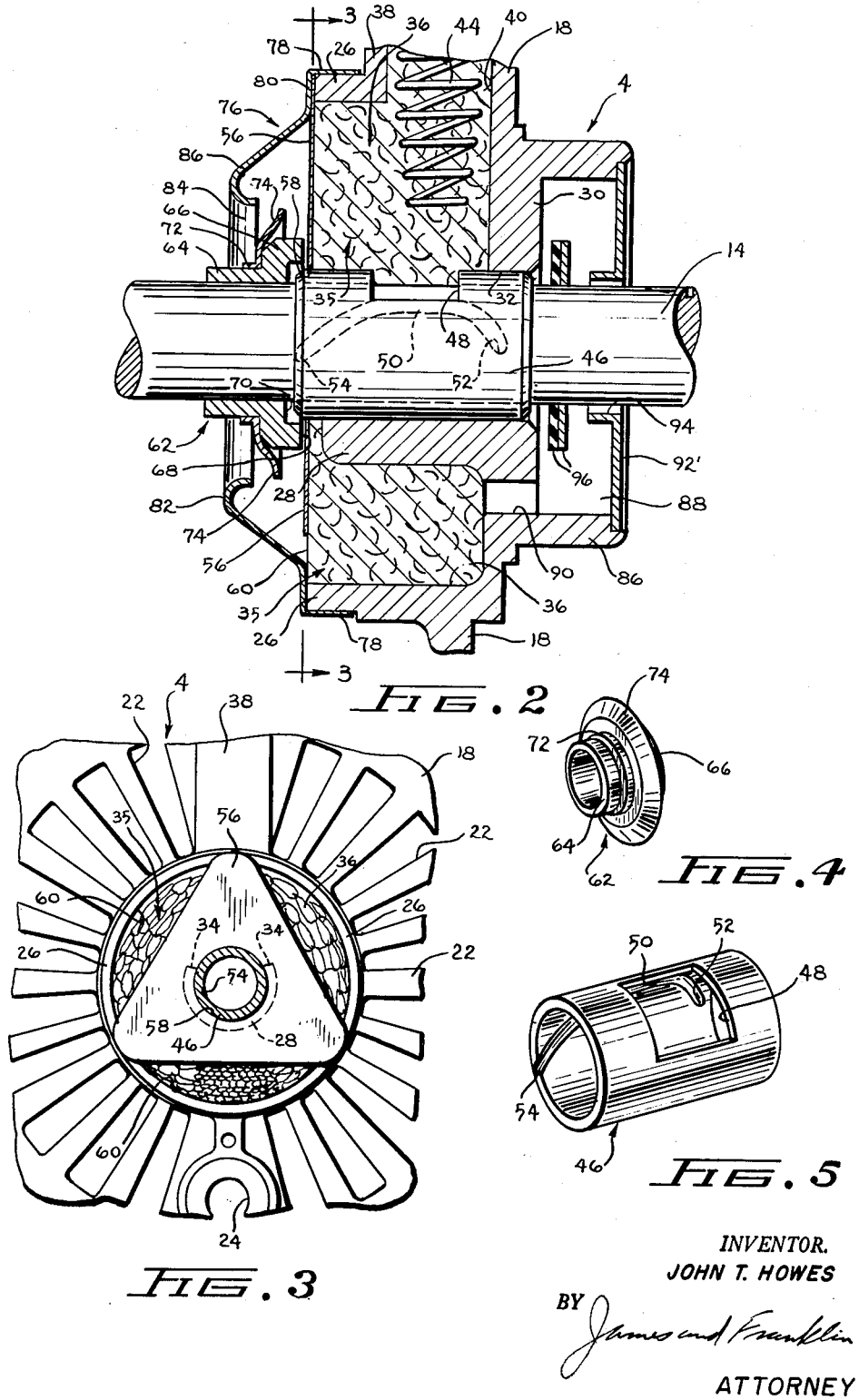
INVENTOR.
JOHN T. HOWES
BY
James and Franklin
ATTORNEY

United States Patent Office 2,739,020
Patented Mar. 20, 1956

2,739,020

BEARING AND LUBRICATING STRUCTURE

John T. Howes, Owosso, Mich., assignor to Redmond Company, Inc., a corporation of Michigan Application June 25, 1953, Serial No. 364,036

13 Claims. (Cl. 308—132)

The present invention relates to a bearing and lubricating structure specifiically designed for use in a fractional horsepower electric motor, the bearing structure providing for effective lubrication of a rotary bearing and an end thrust bearing.

The problem of adequate mounting and lubrication of the rapidly rotating shaft of an electric motor or the like has not yet been solved in a completely satisfactory fashion. Elaborate lubricating structures result in an expensive motor. Particularly in the case of fractional horsepower motors, which are produced in large quantities and with respect to which cost is an important factor from a competitive point of view, the saving of a few cents in the cost of each motor represents a major step forward. The saving in cost can arise not only from decreased cost of component parts, but also from more ready assemblability thereof. Extremely simplified structures have been devised in the past, but usually at the expense of adequate lubrication. Yet lubrication is particularly important in fractional horsepower motors, which are often placed in inaccessible locations and required to operate for long periods of time without supervision.

In the design of a motor or comparable structure, the rotor shaft must not only be rotatively supported in radially accurately fixed relation to the other parts of the structure, but must also have its axial play limited so that the rotating parts will remain in proper relationship to the stationary parts which impart rotative motion thereto.

According to the present invention an easily assembled structure is produced which achieves the above results in a simple and inexpensive manner and which provides, with a single lubricating reservoir, for effective and continued lubrication both of the shaft itself as it rotates within its rotary bearing and also of the axial or end thrust bearing surfaces which, when engaged, take up the axial thrust of the shaft and maintain the shaft and the rotor in proper axial position relative to the remainder of the motor. A circulating system is defined so that a fresh supply of oil is constantly applied to the rotary bearing surfaces and to the end thrust bearing surfaces, the oil then returning to the reservoir where it is available for recirculation.

The shaft end is rotatively mounted in a sleeve-type bearing which has an aperture communicating with the oil reservoir, thus permitting oil to reach the outer shaft surface. The inner surface of the bearing is grooved, so as to permit oil to reach those surfaces of the shaft within the bearing which are not exposed by the aperture. This expedient has long been known. However, the groove in the sleeve bearing of the instant invention extends to the inner end thereof and is open at that end, rotation of the shaft within the bearing causing oil to pass through the groove and to escape from that open end. Secured to the shaft and extending outwardly toward the mounting part which supports the bearing is an end thrust member having a surface adapted to engage an inner surface of the mounting part. This surface is positioned radially outwardly of the bushing. Consequently, as oil escapes from the bearing groove it is urged outwardly by centrifugal force as the shaft rotates and thus lubricates the interengaging surfaces of the end thrust member and the mounting part. The mounting part is provided with one of more apertures radially outside those interengaging surfaces, said apertures communicating with the oil reservoir. It is through those apertures that the oil, after it has lubricated the interengaging end thrust surfaces, returns to the reservoir. In order to ensure this oil return, the end thrust member is provided with a radially and axially outwardly flaring flange directed toward the oil return apertures, the flange catching any oil which may approach it and forcibly throwing it toward the oil return apertures as the shaft rotates. In order to further prevent any escape of oil inside the motor structure, the mounting part may be provided with a cap which extends inwardly beyond the flange on the end thrust member and which has an aperture of closely the same size as the end thrust member flange.

To the accomplishment of the above, and to such other objects as may hereinafter appear, the present invention relates to a bearing and lubricating structure as defined in the appended claims and as described in this specification, taken together with the accompanying drawings, in which:

Fig. 2 is a cross sectional view, on an enlarged scale, of the right hand bearing;

Fig. 3 is a fragmentary end elevational view of the mounting part of Fig. 2, but with the cap removed, taken along the line 3—3 of Fig. 2;

Fig. 4 is a three-quarter perspective view of an end thrust member with attached flange; and Fig. 5 is a three-quarter perspective view of a bushing.

Figure 1:
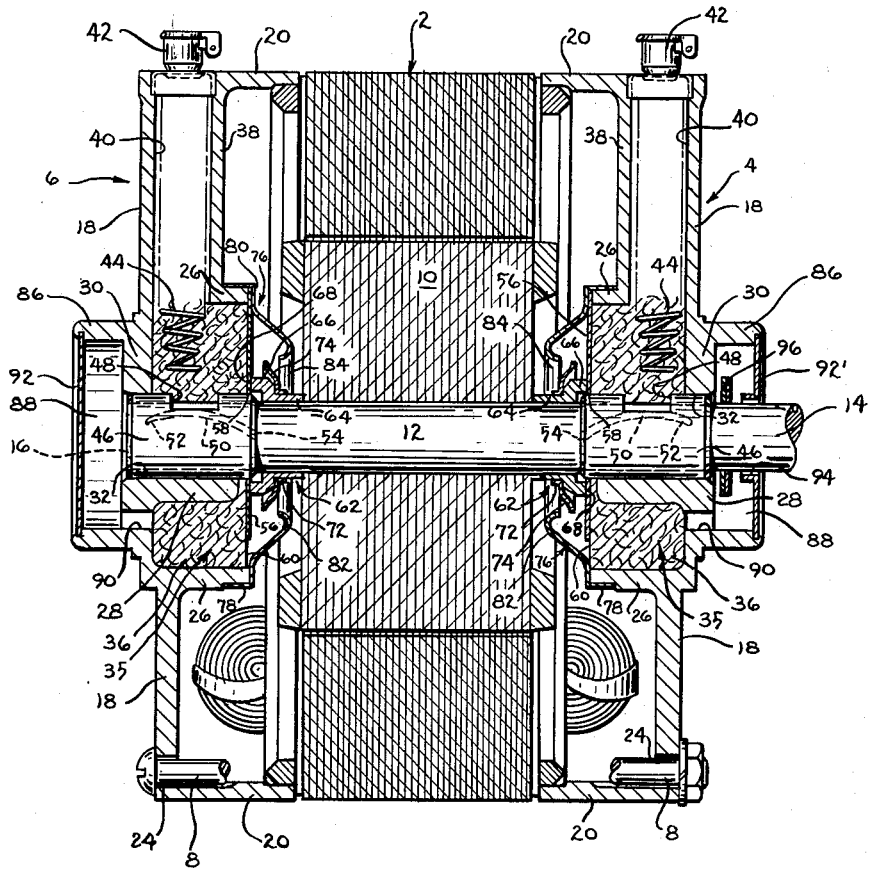
Fig. 1 is a cross sectional view of an electric motor incorporating the present invention.

The invention is here shown as embodied in a fractional horsepower electric motor comprising a stator field structure generally designated 2 to which end mounting parts 4 and 6 are secured by means of screws 8. The rotating portion of the motor comprises a laminated rotor 10 secured in any appropriate manner to shaft 12 so as to be fast thereupon. The shaft 12 has ends 14 and 16 which are rotatively mounted in the bearing structures now to be described.

The two mounting parts 4 and 6 and the bearing structures incorporated therein and cooperating therewith are substantially identical, and description of one will suffice for both. Purely for purposes of illustration, this explanation will deal primarily with the mounting part 4, similar reference numerals being applied to the correspnding portions of the mounting part 6.

The mounting part 4 comprises a body portion 18 having a flange 20 which abuts against the stator field structure 2, radially oriented openings 22 being disposed therethrough for ventilation purposes. A series of apertures 24 are provided near the periphery thereof through which the securing screws 8 can pass. Adjacent the center of the mounting part 4 is an inwardly projecting ring 26, and inside of and preferably concentric with the ring 26 is a hub 28, the hub extending inwardly from the rear wall 30, that rear wall being apertured at 32 concentrically with the hub 28 so that the shaft 14 can pass outwardly therethrough. As here disclosed the hub 28 is U-shaped in cross section so as to define an aperture between its edges 34 (see Fig. 3). The space between the ring 26, hub 28 and rear wall 30 defines an oil reservoir generally designated 35 which extends all around the hub 28 and which is preferably packed with some suitable absorbent stuffing or packing material 36. A boss 38 projects inwardly from the mounting part 4 and extends radially from the ring 26 to the outer periphery of the part 4, that boss being hollow so as to define a filling passage 40 closed at its top by a conventional filling cap 42 and communicating with the oil reservoir 35. If desired, a spring 44 may be retained in compressed condition in the passage 40 and bearing upon the packing 36 so as to press it downwardly, the passage 40 preferably being oriented opposite the aperture in the hub 28 defined by the edges 34 so that the spring 44 presses the packing 36 thereinto.

Fixedly mounted within the hub 28 is bushing 46 of Babbitt metal or the like, that bushing having an aperture 48 disposed in registration with the aperture in the hub 28 defined by the edges 34 thereof. The shaft 12 passes through the bushing 46 and is rotatable therein. The inner surface of the bushing is provided with a groove 50 which extends along one edge of the aperture 48, has one end 52 terminating short of the outer end of the bushing 46, and has another end 54 extending to and open at the inner end of the bushing 46. The length of the bushing 46 is such that its inner end extends inwardly beyond the inner end of the hub 28 and also beyond the inner end of the ring 26.

As thus far described the oil reservoir 35 is only closed on three sides, and is open at its fourth or inner side. That inner side is partially closed by means of a plate 56, here shown as triangular in shape, the tips of which rest on the axially inner surface of the ring 26. The plate 56 is provided with an aperture 58 through which the inwardly extending end of the bushing 46 passes. The triangular shape of the plate 56 defines a plurality of apertures 60 exposing the oil reservoir 35, those apertures 60 all being radially outwardly positioned with respect to the bushing 46. The plate 56 may be formed of any suitable structural material, and in a preferred embodiment is made of stiffly resilient steel.

Secured to the shaft 12 outwardly of the rotor structure 10 and inwardly of the bearing structure thus far described is an end thrust member generally designated 62, that member comprising a sleeve 64 fast on the shaft 12 and having a radially outwardly positioned portion 66 with an axially outwardly directed surface 68 close to the plate 56 and radially outside the inwardly projecting end of the bushing 46. Any tendency of the shaft 12 to move axially will be positively prevented by engagement between the surface 68 and the plate 56. Since two end thrust members 62 are provided, one at each end of the rotor structure 10, it is apparent that the axial position of the shaft 12 and the rotor structure 10 carried thereby, and the degree of end play permitted, will be positively determined by the distance between the surfaces 68 thereon.

It will be noted, particularly from Fig. 2, that the inner end of the bushing 46 is, in effect, received within a space 70 at the outer end of the end thrust member 62. Hence the oil which escapes from the open end 54 of the groove 50 in the bushing 46 will pass into the space 70. As the shaft 12 rotates this oil will be centrifugally forced outwardly, thus passing between the end thrust member surface 68 and the plate 56, lubricating their interengaging surfaces which define the end thrust bearing surfaces. It is preferred that the end thrust member 62 be formed of powdered bronze or similar porous material, such material having the characteristic of becoming impregnated with oil, thus providing effective end thrust bearing lubrication for an appreciable period of time even if the reservoir 35 should run dry and cut off a continued supply of fresh lubricant to the end thrust bearing surfaces.

Mounted on the end thrust member 62 is a metal piece defining a sleeve 72 which fits snugly and fixedly on the sleeve 64 and a radially and axially outwardly directed flange 74 which extends out beyond the side surface of the end thrust member portion 66 and is directed approximately toward the apertures 60 through which access to the oil reservoir 35 may be had. As the shaft 12 rotates, the flange 74 catches that oil which might tend to escape axially to the interior of the motor and forcibly throws the oil axially and radially outwardly toward the apertures 60 so that the oil returns to the reservoir 15.

In order to further ensure against leakage of oil to the interior of the motor, the mounting part ring 26 has a cap 76 mounted thereon, that cap having a rim 78 which snugly frictionally fits around the ring 26, a portion 80 which fits over the tips of the plate 56 and holds that plate in place, and an axially and radially inwardly directed flange 82 terminating in a central aperture 84 of closely the same size as the flange 74 carried by the end thrust member 62.

Thus a substantially closed circulatory system for lubricant is provided. The stuffing or packing 36, saturated with lubricant introduced through the filling cap 42 and the passage 40, is wiped by the shaft 12 as the latter rotates within the bushing 46, lubricant passing through the aperture in the hub 28 defined by the edges 34 thereof and through the aperture 48 in the bushing 46 and onto the surface of the shaft 12. The spring 44, if present, ensures that proper wiping engagement obtains between the rotating shaft 12 and the oil-saturated packing 36. As the shaft 12 rotates this oil passes through the groove 50, thus lubricating substantially the entire length of the shaft which rotates within the bushing 46. The rotation of the shaft 12 causes a small but substantially steady stream of oil to pass out of the groove 50 through the open end 54 thereof and into the space 70. From there centrifugal action ensures that the oil passes between the end thrust member surface 68 and the plate 56, thus lubricating the end thrust bearing surfaces. That oil which thereafter slides downwardly along the inner surface of the plate 56 will eventually reach an aperture 60 and return to the reservoir 35. Other oil will be caught by the flange 74 carried by the end thrust member 62 and, again by centrifugal action, will be forcibly thrown back into the reservoir 35 via the apertures 60. This circulation of lubricant will continue for as long as the shaft 12 rotates.

Because the outer end of the groove 52 in the bushing 46 terminates short of the outer end of the bushing, there will be very little leakage of oil to the outer end of the shaft. However, because there may be some leakage of that character, the mounting part 4 is provided with an outwardly extending ring 86 defining, together with the wall 30, an oil receiving space 88, apertures 90 being provided through the wall 30 at least at the lower portions thereof so that any oil which collects in the space 88 can return to the reservoir 35. Since the left hand shaft 16 does not extend out beyond the mounting part 6, the outer end of the space 88 in the mounting part 6 is closed by an imperforate disk 92. The right hand end 14 of the shaft 12 does extend out beyond the mounting part 4, and consequently the disk 92' which closes the outer end of the space 88 in the mounting part 4 is provided with an aperture 94 through which the shaft end 14 freely passes. The shaft is provided with a pair of washers 96 fast thereon and inside the space 88 so as to prevent lubricant from leaking along the shaft 14 and out of the aperture 94, any oil which reaches the washers 96 being guided and forced by them outwardly with respect to the aperture 94.

Since, as has been seen, end play of the rotor structure is controlled by the distance between the end thrust member surfaces 68 at opposite ends of the rotor 10, the control of end play on a production line basis is greatly facilitated. Slight variations in the length of the laminated rotor stack 10 can be compensated for merely by machining the end thrust member surfaces 68 after the end thrust members 62 have been placed in position on the shaft 12 so that the desired spacing between them is achieved.

During operation of the motor the surfaces 68 bear against the plates 56 in order to control and limit end play. Because the plates 56 are preferably formed of some stiff but resilient material, end play is cushioned thereby, the shaft 12 is automatically restored to its proper position after the axial forces on the shaft 12 disappear, and smooth motor operation results.

The structure here disclosed utilizes a minimum of parts to achieve extremely effective lubrication and to produce rotary and end thrust bearings. All of the parts are exceedingly simple and inexpensive. They are very readily assembled. Provision is made for a single continuous lubricant circulatory system at each end of the shaft for lubricating both the rotative and end thrust bearings. The specific structure involved for the end thrust bearing members facilitates production by providing an easy means for controlling end play within close tolerances without requiring that the rotor lamination stack 10 be manufactured to comparable tolerances. The entire structure is very readily assembled on a production line basis.

It will be apparent that many variations may be made in the details of the structure here disclosed without departing from the spirit of the invention as defined in the following claims.

I claim:

1. In an electric motor comprising a mounting part and a rotor, the rotor being on a shaft journalled on said mounting part; the improvement which comprises said mounting part having an axially inner surface, a bushing on said mounting part in which said shaft is rotatably received, the inner end of said bushing extending axially inwardly beyond said mounting part inner surface toward said rotor, an oil reservoir in said mounting part, said bushing having an aperture therethrough communicating with said reservoir, and a thrust member secured to said shaft axially inwardly of said mounting part and having an axially outwardly directed surface engaging said axially inner surface of said mounting part radially outside said inner bushing end, said inner bushing end and said thrust member having a space therebetween, oil which passes out of said bushing at said inner bushing end entering said space and then lubricating said thrust member and the area of said mounting part inner surface engaged thereby.

2. In an electric motor comprising a mounting part and a rotor, the rotor being on a shaft journalled on said mounting part; the improvement which comprises said mounting part having an axially inner surface, a bushing on said mounting part in which said shaft is rotatably received, the inner end of said bushing extending axially inwardly beyond said mounting part inner surface toward said rotor, an oil reservoir in said mounting part, said bushing having an aperture therethrough communicating with said reservoir, said reservoir being exposed adjacent the inner end of said mounting part, a bearing plate adjacent the inner end of said mounting part at least partially covering the exposed section of said reservoir, said plate having an aperture through which said extended bushing end passes, the axially inner surface of said plate defining said axially inner surface of said mounting part, and an end thrust member secured to said shaft axially inwardly of said mounting part and having an axially outwardly directed surface engaging said axially inner surface of said bearing plate along an area radially outside of said inner bushing end, said inner bushing end and said thrust member having a space therebetween, oil which passes out of said bushing at said inner bushing end entering said space and then lubricating said thrust member and the area of said bearing plate engaged thereby.

3. In an electric motor comprising a mounting part and a rotor, the rotor being on a shaft journalled on said mounting part; the improvement which comprises said mounting part having an axially inner surface, a bushing on said mounting part in which said shaft is rotatably received, the inner end of said bushing extending axially inwardly beyond said mounting part inner surface toward said rotor, an oil reservoir in said mounting part, said bushing having an aperture therethrough connected with said reservoir, a substantially rigid thrust member secured to said shaft axially inwardly of said mounting part so as to be rotationally and axially fixed relative thereto and having an axially outwardly directed surface engaging said axially inner surface of said mounting part radially outside of said inner bushing end, said inner bushing end and said thrust member having a space therebetween, oil which passes out of said bushing at said inner bushing end entering said space and then lubricating said thrust member and the area of said mounting part inner surface engaged thereby.

4. In an electric motor comprising a mounting part and a rotor, the rotor being on a shaft journalled on said mounting part; the improvement which comprises said mounting part having an axially inner surface, a bushing on said mounting part in which said shaft is rotatably received, the inner end of said bushing extending axially inwardly beyond said mounting part inner surface toward said rotor, an oil reservoir in said mounting part, said bushing having an aperture therethrough communicating with said reservoir, said reservoir being exposed adjacent the inner end of said mounting part, a bearing plate adjacent the inner end of said mounting part at least partially covering the exposed section of said reservoir, said plate having an aperture through which said extended bushing end passes, the axially inner surface of said plate defining said axially inner surface of said mounting part, and a substantially rigid end thrust member secured to said shaft axially inwardly of said mounting part so as to be rotationally and axially fixed relative thereto and having an axially outer surface engaging said axially inner surface of said bearing plate along an area radially outside of said inner bushing end, said inner bushing end and said thrust member having a space therebetween, oil passing out of said bushing at the inner end thereof entering said space and then lubricating said thrust member and the area of said bearing plate engaged thereby.

5. The motor of claim 1, in which said mounting part inner surface has an opening positioned radially outwardly of said bushing and communicating with said reservoir, and in which said thrust member is provided with a flange positioned axially inwardly of said mounting part-engaging surface and flaring radially and axially outwardly beyond the side surface of the remainder of said member, said flange catching oil which escapes axially inwardly beyond said member and throwing said oil toward said opening when said rotor is rotated, said mounting part having a radially and axially inwardly extending flange extending from points on said mounting part radially outside said opening to points axially inwardly of the end of said flange on said thrust member, the radially inner ends of said mounting part flange defining an opening of a radial size greater than that of said thrust member flange.

6. The motor of claim 2, in which said bearing plate has an opening positioned radially outwardly of said bushing and communicating with said reservoir, and in which said thrust member is provided with a flange positioned axially inwardly of said plate-engaging surface and flaring radially and axially outwardly beyond the side surface of the remainder of said member, said flange catching oil which escapes axially inwardly beyond said member and throwing said oil toward said opening when said rotor is rotated.

7. The motor of claim 2, in which said bearing plate has an opening positioned radially outwardly of said bushing and communicating with said reservoir, and in which said thrust member is provided with a flange positioned axially inwardly of said plate-engaging surface and flaring radially and axially outwardly beyond the side surface of the remainder of said member, said flange catching oil which escapes axially inwardly beyond said member and throwing said oil toward said opening when said motor is rotated, said mounting part having a radially and axially inwardly extending flange extending from points on said mounting part radially outside said opening to points axially inwardly of the end of said flange on said thrust member, the radially inner ends of said mounting part flange defining an opening of a radial size greater than that of said thrust member flange.

8. The motor of claim 3, in which said mounting part inner surface has an opening positioned radially outwardly of said bushing and communicating with said reservoir, and in which said thrust member is provided with a flange positioned axially inwardly of said mounting part-engaging surface and flaring radially and axially outwardly beyond the side surface of the remainder of said member, said flange catching oil which escapes axially inwardly beyond said member and throwing said oil toward said opening when said rotor is rotated, said mounting part having a radially and axially inwardly extending flange extending from points on said mounting part radially outside said opening to points axially inwardly of the end of said flange on said thrust member, the radially inner ends of said mounting part flange defining an opening of a radial size greater than that of said thrust member flange.

9. The motor of claim 4, in which said bearing plate has an opening positioned radially outwardly of said bushing and communicating with said reservoir, and in which said thrust member is provided with a flange positioned axially inwardly of said plate-engaging surface and flaring radially and axially outwardly beyond the side surface of the remainder of said member, said flange catching oil which escapes axially inwardly beyond said member and throwing said oil toward said opening when said rotor is rotated.

10. The motor of claim 4, in which said bearing plate has an opening positioned radially outwardly of said bushing and communicating with said reservoir, and in which said thrust member is provided with a flange positioned axially inwardly of said plate-engaging surface and flaring radially and axially outwardly beyond the side surface of the remainder of said member, said flange catching oil which escapes axially inwardly beyond said member and throwing said oil toward said opening when said motor is rotated, said mounting part having a radially and axially inwardly extending flange extending from points on said mounting part radially outside said opening to points axially inwardly of the end of said flange on said thrust member, the radially inner ends of said mounting part flange defining an opening of a radial size greater than that of said thrust member flange.

11. In the combination of a shaft and a mounting part therefor; the improvement which comprises said mounting part comprising a body having a rear wall, a ring projecting inwardly therefrom, and a hub projecting inwardly from said wall inside said ring, the space between said ring and said hub defining an oil reservoir having a substantially exposed inner end, a bushing in said hub and extending therefrom inwardly further than said ring, said shaft being rotatably mounted inside said bushing, communicating apertures in said bushing and said hub defining a passage between said reservoir and the interior of said bushing, a groove on the inner surface of said bushing communicating between said bushing aperture and the inner end of said bushing, a bearing plate mounted on said ring and having an aperture through which said extended bushing end passes, said bearing plate only incompletely covering the exposed inner end of said reservoir so as to define an opening to said reservoir radially outwardly spaced from said bushing, and a cap on said ring overlying that portion of said bearing plate on said ring so as to retain said bearing plate in place, and having a flange the radially outer portion of which is radially outside said opening to said reservoir and which extends radially and axially inwardly, the radially inner portion of which defines an aperture coaxial with but larger than said bushing.

12. In the combination of claim 11, an end thrust member secured to said shaft axially inwardly of said bearing plate and having an outwardly directed surface adapted to engage said bearing plate radially outwardly of said bushing and radially inwardly of said opening to said reservoir, said member being passable through said cap aperture.

13. The combination of claim 12, in which said end thrust member is provided with a flange positioned axially inwardly of said plate-engaging surface and flaring radially and axially outwardly beyond the side surface of said member, said member flange catching oil which escapes axially inwardly beyond said member and throwing said oil toward said opening when said shaft is rotated.

References Cited in the file of this patent
UNITED STATES PATENTS

| | | |
|---|---|---|
| 776,669 | Mattice | Dec. 6, 1904 |
| 1,120,344 | Templin | Dec. 8, 1914 |
| 1,715,840 | Janette | June 4, 1929 |
| 1,912,101 | Short | May 30, 1933 |
| 1,987,178 | Brown | Jan. 8, 1935 |
| 2,226,622 | Lignian | Dec. 31, 1940 |